June 18, 1957 R. W. LITTLE 2,795,899
AUTOMATIC TREE INJECTOR
Filed Feb. 28, 1955 2 Sheets-Sheet 2

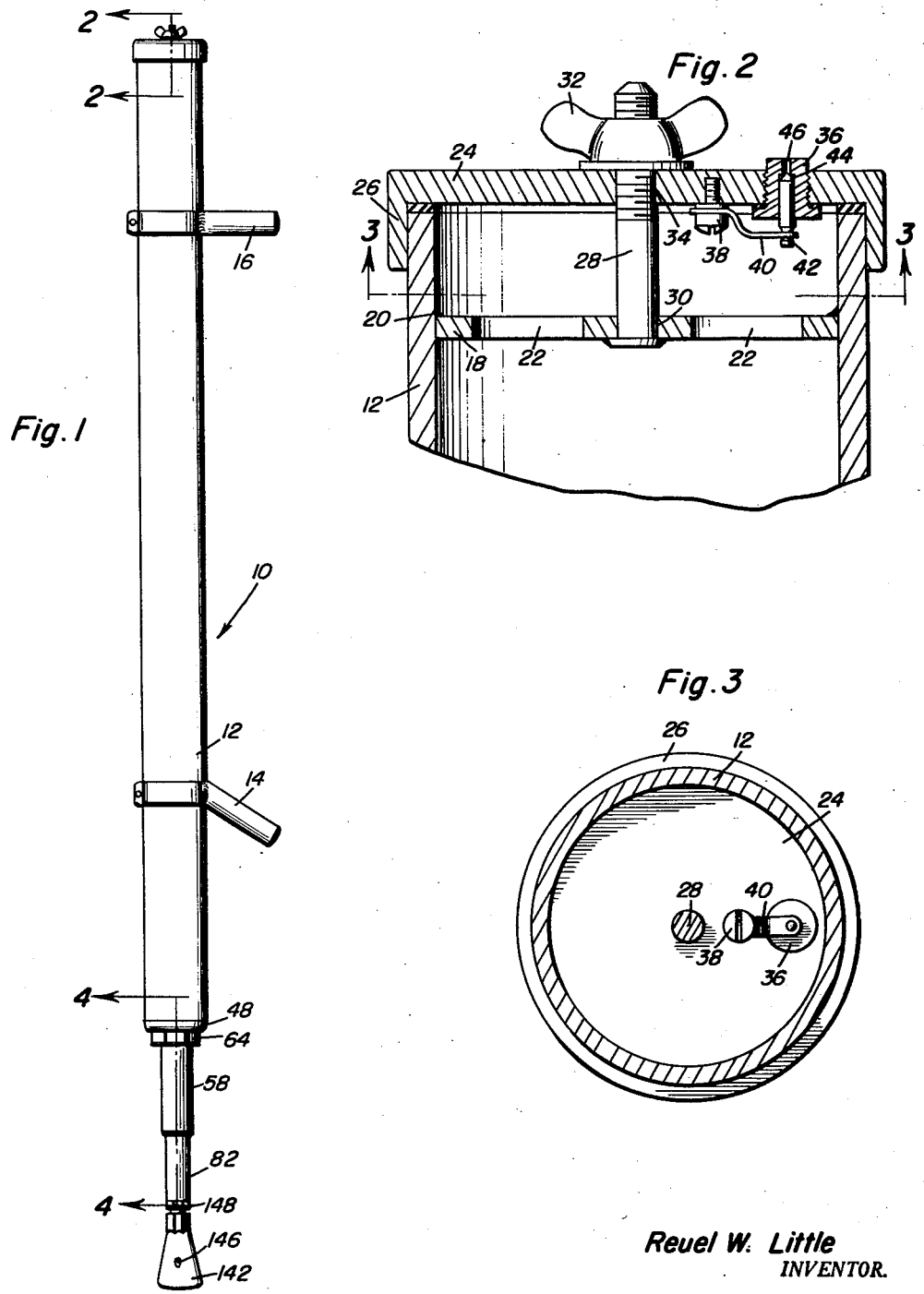

Reuel W. Little
INVENTOR.

BY *Clarence A. O'Brien*
*and Harvey B. Jackson*
Attorneys

United States Patent Office 2,795,899
Patented June 18, 1957

2,795,899
AUTOMATIC TREE INJECTOR
Reuel W. Little, Madill, Okla.
Application February 28, 1955, Serial No. 491,048
10 Claims. (Cl. 47—57.5)

This invention relates to an automatic tree injector for treating trees or shrubs with any suitable fluid in order to keep the tree alive, for the purpose of making the tree grow, or for deadening the tree, as the case may be.

As is well known, the clearing of land is usually a considerable task. Trees are generally burned and the land is put into cultivation. During the years that follow, additional time and effort must be continuously expended in cutting the sprouts that rise from the root system of the trees which were burned. It is therefore the primary object of the present invention to provide means for killing the entire tree, including the root system, so as to prevent further sprouting of the tree after the land has been cleared.

A further object of the invention resides in the provision of a tree injector which may be used to easily and quickly deposit a metered amount of fluid beneath the relatively hard outer bark of a tree and into a pocket formed in the inner bark or cambium of the tree. A plant hormone or the like may be applied so as to cause the tree to grow itself to death, or other suitable poisonous substances may be utilized as desired.

The construction of this invention features an arrangement of parts wherein the tree injector can be forcibly thrust into the outer bark of a tree or bush and into the inner bark making an indentation or pocket therein and simultaneously by automatic action of a valve filling the indentation or pocket with fluid to deaden the tree, the fluid being stored in the barrel of the tree injector and automatically emitted into a housing wherein a measured amount of the fluid is maintained prior to delivery to the blade of the tree injector.

The present invention may be used in an efficient manner in the care and treatment of trees so that trees which may be deficient in certain food elements may be supplied with measured amounts thereof and substances of medicinal value to the trees may be easily injected therein.

Still further objects and features of this invention reside in the provision of an automatic tree injector that is simple in construction, highly efficient in use, strong and durable, and which may be used conveniently even though there is extensive underbrush present at the location of a particular tree, yet which is inexpensive to manufacture, thereby permitting wide distribution and utilization.

These, together with the various ancillary objects and features of the invention which will become apparent as the following description proceeds, are attained by this automatic tree injector, a preferred embodiment of which has been illustrated in the accompanying drawings, by way of example only, wherein:

Figure 1 is a side elevational view of the automatic tree injector;

Figure 2 is an enlarged sectional detailed view illustrating the construction of the cap for the barrel of the tree injector and the associated automatic release valve;

Figure 3 is a horizontal sectional detailed view as taken along the plane of line 3—3 in Figure 2;

Figure 4:
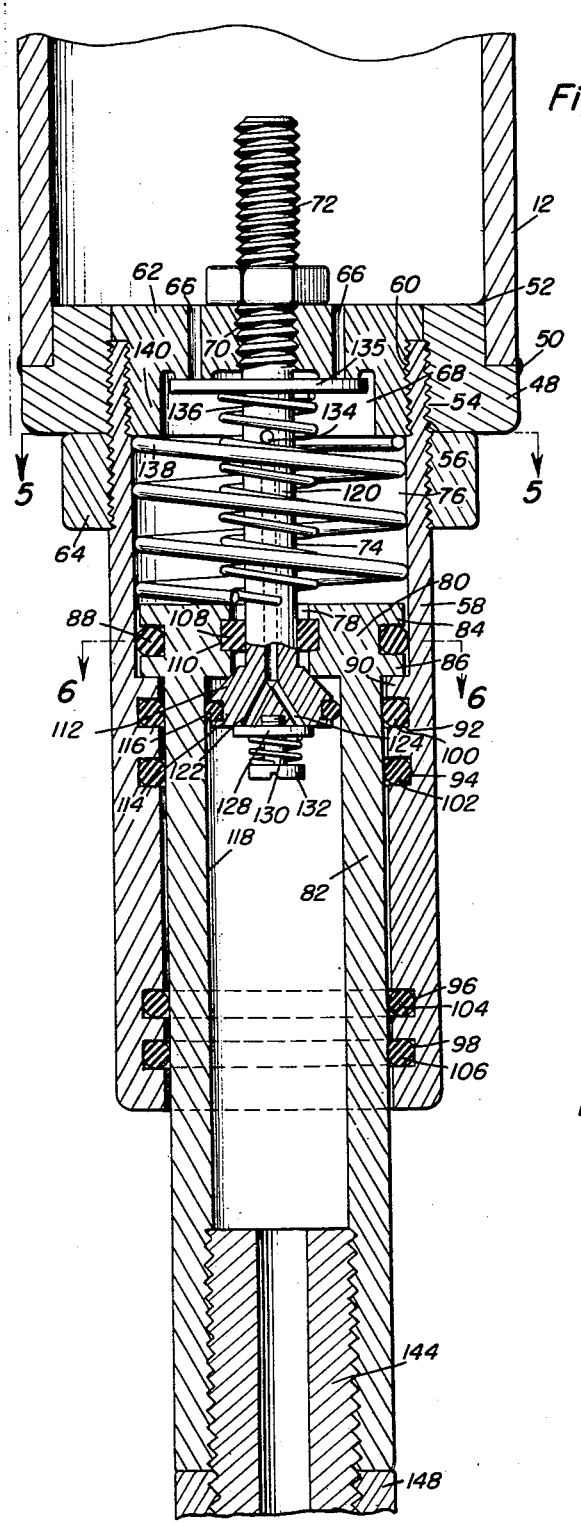
Figure 4 is an enlarged vertical sectional detailed view as taken along the plane of line 4—4 in Figure 1 and illustrating in particular the construction of the valve assembly.
Figure 5:
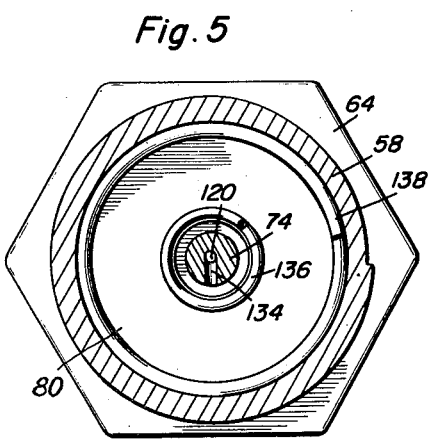
Figure 5 is a sectional detail view as taken along the plane of line 5—5 in Figure 4.
Figure 6:
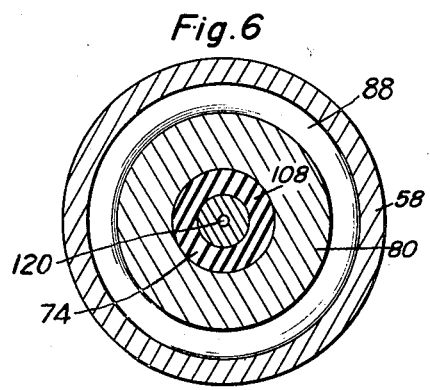
Figure 6 is a sectional detail view as taken along the plane of line 6—6 in Figure 4.

Briefly summarized, it will be seen that the elongated barrel functions as a container or reservoir for the desired injection fluid. The upper end is provided with suitable venting means. More importantly, the barrel is of a length that, when it is held substantially in a vertical position ready to use, the upper end reaches to and above the shoulders of the user. This is so that it may be caught hold of, manually lifted and then vigorously rammed toward the tree. Therefore, the barrel is, in effect, a hollow ramrod. To facilitate operating it there is an upper hand-grip which is situated below the upper end of the barrel and in addition there is a lower hand-grip which is situated above the lower end of the barrel and preferably directly beneath the upper hand-grip whereby the two in conjunction with the barrel facilitate aiming and plunging it toward the target. The barrel is of a weight, in conjunction with the other components, to permit it to be literally "thrown" in the direction of the tree. A rugged, heavy-duty bark penetrating and cleaving blade is provided and this is wedge-shaped and has a centrally pointed concavo-convex face and a broad arcuately curved axe-like cutting edge and, in addition, an axially bored sturdy shank. Interposed between the shank and the lower or leading end of the barrel there is a thrust-responsive automatically operable fluid trapping, metering and force feed pump. This operatively joins at its upper end to the lower leading valved end of the barrel and it is operatively and communicatively connected at its lower end to the upper end of the shank so that the fluid is released from the measuring chamber in the pump and is properly valved at the time the strike is made, permitting a pocket to be formed in the tree at the cambium layer and the fluid to be pooled in the pocket during which time the barrel functions as a lever and allows the pocket to be spread open before the blade is withdrawn.

With continuing reference to the accompanying drawings wherein like reference numerals designate similar parts throughout the various views, reference numeral 10 generally designates the tree injector comprising the present invention, having suitable handles as at 14 and 16 for enabling the user of this tree injector to readily accomplish the necessary tasks.

As can be seen best in Figure 2, the upper portion of the barrel 12 has an inner plate 18 welded as at 20 or otherwise secured thereto, the plate being perforated as at 22. A cap 24 having a peripheral flange 26 is secured to the barrel 12 and held in fluid-tight engagement therewith by means of a stud-bolt 28 which extends through an aperture 30 in the plate 18 and which is held in place by a wing nut 32 after extending through an aperture 34 in the cap 24.

The cap 24 is provided with an automatic release valve mechanism 36 which includes a screw fastener 38 carrying a guide 40 engaging a valve member 42 and adapted to resiliently hold the valve member 42 at its conical point 44 thereof so as to close the vent 46 except when the pressure inside of the barrel 12 is less than atmospheric pressure.

Referring now to Figure 4, it will be seen that the barrel 12 has a lower closure member 48 secured thereto as by welding at 50 and 52 or by any other suitable means. The closure member 48 is suitably threaded as at 54 for threaded reception of the external threads 56 of a housing 58 which is also internally threaded as at 60 for threaded reception of a plug 62. A lock nut 64 is threadedly received on the outer threads 54 of the housing 58 to hold the housing 58 in position.

The plug 62 is provided with a series of apertures or ports 66 therethrough which communicate with a recess 68 in the underside of the plug. The plug 62 is axially bored and threaded as at 70 for threaded reception and retention of the threaded upper end 72 of a guide rod or valve member 74. The valve member 74 extends down and through the metering chamber 76 of the housing 58 and down through an aperture 78 in the piston 80 of a tubular plunger or casing 82. The casing 82 is slidable relative to the housing 58 and reciprocates therein. The piston 80 has a pair of annular flanges 84 and 86 carrying an annular ring seal 88 formed of neoprene or like material while below the chamber 76, the housing 58 has a thickened wall as at 90 and the upper end of this constitutes an endless stop shoulder. This thickened portion is also provided with annular grooves or recesses 92, 94, 96 and 98 seating packing rings 100, 102, 104 and 106. These rings are effectually engageable with the casing 82 to make a fluid tight seal.

The valve member 74 extends through a gasket or seal 108 carried in a groove 110 in the upper wall 80 of the casing 82 and has a headed portion of generally conical configuration as at 112 which is provided with an annular groove 114 receiving a sealing ring 116 engageable with the inner walls 118 of the casing 82. A passageway 120 is formed in the valve member 74 and has divergent branches 122 and 124 at its lower end adapted to be closed by a valve plate 128 spring pressed by means of a spring 130 into a closed position and adjusted by means of a threaded screw member 132 threadedly received into the head 112.

A partial transverse bore 134 communicates with the passageway 120 and connects the branches 122 and 124 with the interior of the chamber 76.

Slidably mounted on the valve member 74 is a valve closure disc 135 adapted to close the fluid discharge opening 66. A first coil spring 136 is provided and biases the disc 135 and the wall 80 of the casing 82 in such a manner as to urge the disc 135 to close the discharge openings 66. A second and much stronger coil spring 138 is provided and is concentrically positioned about the valve member 74 and about the spring 136, the spring 138 butts against the flange 140 formed by the recess 68 in the plug 62, and also rests upon the top wall 80 of the casing 82.

The operation of this invention is quite simple. When it is desired to inject a suitable amount of fluid into the inner bark or cambium layer of a tree, it is merely necessary to forcibly drive the blade 142 into the tree, the blade 142 being provided with any suitable number of outlet openings 146, as may be desired. The blade 142 may be held in place by means of a lock nut 148. This will cause the casing 82 to be urged upwardly with respect to the housing 58 and cause the springs 136 and 138 to be compressed. Compression of the spring 138 will store energy therein while the compression of the spring 136 will also assure that the disc 135 will be held in position so as to close the fluid discharge openings 66. The upward movement of the casing 82 will force fluid under pressure through the opening 134 and downwardly through the passageway 120 and out of the branches 122 and 124 forcing the plate 128 so as to compress the spring 130. This will deliver a metered amount of fluid to the blade 142.

When the barrel 12 is released, the stored energy in the springs 138 and 136 will cause the parts of the invention to assume the initial position and compression on the spring 136 will be sufficiently released as to allow fluid to pass through the discharge openings 66 into the chamber 76. Further, the spring 130 will cause the plate 128 to close the branches 122 and 124. Since there is no longer any sizeable amount of fluid in the chamber 76 after it has been discharged from the blade, this will cause a partial vacuum in the chamber 76, thus enabling the pressure of the fluid in the barrel 12 to overcome the force exerted by the spring 136 when it is not under compression.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. An automatic tree injector comprising an elongated barrel, a housing secured to said barrel, a valve casing slidably mounted in said housing and having an aperture therethrough, a bark penetrating blade attached to said valve casing, a plug secured to said housing having fluid delivery openings therethrough, a valve member secured to said plug and extending through said aperture and into said casing, a fluid passageway in said valve member, a spring pressed valve member normally closing said passageway, and a disc about said valve member slidable relative thereto for closing said fluid delivery openings.

2. An automatic tree injector comprising an elongated barrel, a housing secured to said barrel, a valve casing slidably mounted in said housing and having an aperture therethrough, a bark penetrating blade attached to said valve casing, a plug secured to said housing having fluid delivery openings therethrough, a valve member secured to said plug and extending through said aperture and into said casing, a fluid passageway in said valve member, a spring pressed valve member normally closing said passageway, a disc about said valve member slidable relative thereto for closing said fluid delivery openings, said plug having a recess forming a peripheral flange, said fluid delivery openings communicating with said recess, said disc seating in said recess.

3. An automatic tree injector comprising an elongated barrel, a housing secured to said barrel, a valve casing slidably mounted in said housing and having an aperture therethrough, a bark penetrating blade attached to said valve casing, a plug secured to said housing having fluid delivery openings therethrough, a valve member secured to said plug and extending through said aperture and into said casing, a fluid passageway in said valve member, a spring pressed valve member normally closing said passageway, a disc about said valve member slidable relative thereto for closing said fluid delivery openings, said casing having a pair of annular flanges carrying a sealing ring therebetween engaging said housing, said housing having annular recesses receiving sealing rings engaging said casing.

4. An automatic tree injector comprising an elongated barrel, a housing secured to said barrel, a valve casing slidably mounted in said housing and having an aperture therethrough, a bark penetrating blade attached to said valve casing, a plug secured to said housing having fluid delivery openings therethrough, a valve member secured to said plug and extending through said aperture and into said casing, a fluid passageway in said valve member, a spring pressed valve member normally closing said passageway, a disc about said valve member slidable relative thereto for closing said fluid delivery openings, said plug having a recess forming a peripheral flange, said fluid delivery openings communicating with said recess, said disc seating in said recess, an inner spring biasing said disc and said casing, and an outer spring coaxial with said inner spring biasing said peripheral flange and said casing.

5. An automatic tree injector comprising an elongated barrel, a housing secured to said barrel, a valve casing slidably mounted in said housing and having an aperture therethrough, a bark penetrating blade attached to said valve casing, a plug secured to said housing having fluid delivery openings therethrough, a valve member secured to said plug and extending through said aperture and into said casing, a fluid passageway in said valve member, a spring pressed valve member normally closing said passageway, a disc about said valve member slidable relative thereto for closing said fluid delivery openings, said plug having a recess forming a peripheral flange, said fluid delivery openings communicating with said recess, said disc seating in said recess, said casing having a pair of annular flanges carrying a sealing ring therebetween engaging said housing, said housing having annular recesses receiving sealing rings engaging said casing.

6. An automatic tree injector comprising an elongated barrel, a housing secured to said barrel, a valve casing slidably mounted in said housing and having an aperture therethrough, a bark penetrating blade attached to said valve casing, a plug secured to said housing having fluid delivery openings therethrough, a valve member secured to said plug and extending through said aperture and into said casing, a fluid passageway in said valve member, a spring pressed valve member normally closing said passageway, a disc about said valve member slidable relative thereto for closing said fluid delivery openings, said plug having a recess forming a peripheral flange, said fluid delivery openings communicating with said recess, said disc seating in said recess, an inner spring biasing said disc and said casing, and an outer spring coaxial with said inner spring biasing said peripheral flange and said casing, said casing having a pair of annular flanges carrying a sealing ring therebetween engaging said housing, said housing having annular recesses receiving sealing rings engaging said casing.

7. A tree injector comprising a rigid elongate barrel constituting a reservoir for fluid, said barrel being vented, upper and lower handles adjustably mounted on and radiating from said barrel at vertically spaced-apart positions, closure means mounted on the lower leading end of said barrel having valved ports by way of which a predetermined amount of fluid is allowed to be forcibly withdrawn and discharged from said barrel, an axially positioned cylindrical housing fixed at its upper end to said closure means and being in communication with said valved discharge ports, said housing constituting a cylinder and being provided interiorly with a stop shoulder spaced downwardly from said closure means, an axially bored casing mounted for reciprocation in said housing and having a spring pressed piston on its upper end normally spring biased and seated on said stop shoulder and spaced from said closure means and defining a fluid trapping, quantity measuring and dispensing chamber between itself and said closure means, valved rod means adjustably mounted on the closure means, bridging said chamber, communicable with the chamber in a manner to bleed the trapped fluid, when under pressure, from said chamber and to deliver it into the bore of said casing, and a tree bark penetrating, cleaving and fluid injecting blade having a bored shank communicatively connected with the leading end of said casing, whereby when the blade is forcibly rammed into the tree, said piston scavenges the trapped fluid from said chamber, causing it to leave the chamber by way of the valved means and to shoot under pressure into the bore of said casing.

8. The structure defined in claim 7 and wherein said valved rod means extends through an axial opening provided therefor in said piston and terminates in a valve-equipped head, the latter being normally disposed in the upper portion of the bore of said casing.

9. The structure defined in claim 7 and wherein said barrel is of a length, when held substantially vertically, to reach to and above the shoulders of the user, whereby it may be caught hold of, manually lifted and then vigorously rammed toward the tree in a manner to focus and drive the cleaving blade home, and said blade, barrel and all parts carried thereby providing the mass and impetus needed to afford the weight and thrust required to sink the blade and automatically dispense the measured amount of fluid.

10. A tree injector comprising a rigid elongate barrel constituting a reservoir for fluid, said barrel being vented, upper and lower handles adjustably mounted on and radiating from said barrel at vertically spaced-apart positions, closure means mounted on the lower leading end of said barrel having valved ports by way of which a predetermined amount of fluid is allowed to be forcibly withdrawn and discharged from said barrel, an axially positioned cylindrical housing fixed at its upper end to said closure means and being in communication with said valved discharge ports, said housing constituting a cylinder and being provided interiorly with a stop shoulder spaced downwardly from said closure means, an axially bored casing mounted for reciprocation in said housing and having a spring pressed piston on its upper end normally spring biased and seated on said stop shoulder and spaced from said closure means and defining a fluid trapping, quantity measuring and dispensing chamber between itself and said closure means, said piston having a central fluid emitting opening, a valve rod having a head on its lower end located in the upper portion of the bore of said casing, said rod extending upwardly through said opening, spanning said chamber vertically and having its upper end adjustably and detachably connected with said closure means, said rod having an axial passage for fluid with an intake port confined for operation in said chamber and discharge branches opening through said head, a spring closed valve element carried by said head and normally covering and closing said branches, said passage serving to empty said chamber and deliver the fluid while under pressure into the bore of said casing by way of the valved branches in said head, and a tree bark penetrating, cleaving and fluid injecting blade having a bored shank communicatively connected with the leading end of said casing, whereby when the blade is forcibly rammed into the tree, said piston scavenges the trapped fluid from said chamber, causing it to leave the chamber by way of the valved means and to shoot under pressure into the bore of said casing.

References Cited in the file of this patent

UNITED STATES PATENTS

| 551,527 | Cunningham | Dec. 17, 1895 |
| 951,760 | Foulke | Mar. 8, 1910 |
| 1,934,080 | Meyer | Nov. 7, 1933 |
| 2,069,684 | Schroeder | Feb. 2, 1937 |
| 2,206,053 | Schroeder | July 2, 1940 |
| 2,290,363 | Stirton | July 21, 1942 |
| 2,687,598 | Calhoun | Aug. 31, 1954 |

FOREIGN PATENTS

| 3,939 | Australia | 1912 |
| 8,462 | Australia | 1913 |
| 708,127 | France | Apr. 27, 1931 |
| 9,555 | Great Britain | 1892 |

OTHER REFERENCES

Cope: "The Killing of Trees," J. Forestry, vol. 29, No. 5, pages 775–783, May 1931.